United States Patent
Ananth et al.

(10) Patent No.: US 10,477,418 B1
(45) Date of Patent: Nov. 12, 2019

(54) OPERATION OF SECTORIZED COMMUNICATIONS FROM AEROSPACE PLATFORMS USING REINFORCEMENT LEARNING

(71) Applicant: LOON LLC, Mountain View, CA (US)

(72) Inventors: Sharath Ananth, Cupertino, CA (US); Brian Barritt, San Jose, CA (US); Jin Zhang, Mountain View, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 16/222,407

(22) Filed: Dec. 17, 2018

(51) Int. Cl.
| | |
|---|---|
| *H04B 7/185* | (2006.01) |
| *H04W 4/00* | (2018.01) |
| *H04W 24/02* | (2009.01) |
| *G06N 3/08* | (2006.01) |
| *H04W 84/06* | (2009.01) |

(52) U.S. Cl.
CPC ............ *H04W 24/02* (2013.01); *G06N 3/08* (2013.01); *H04W 84/06* (2013.01)

(58) Field of Classification Search
CPC .......... H04W 72/085; H04W 72/0406; H04W 24/02; H04W 24/08; H04W 40/02; H04W 40/24; H04B 7/0617; H04B 7/0695; H04B 7/0632; H04B 7/088
USPC ...................... 455/12.1, 427, 446; 370/329
See application file for complete search history.

(56) References Cited

U.S. PATENT DOCUMENTS

| | | | | |
|---|---|---|---|---|
| 5,706,278 | A | * | 1/1998 | Robillard .......... H04L 12/40156 370/222 |
| 6,954,647 | B2 | * | 10/2005 | Lin ....................... H04W 60/04 455/455 |
| 10,200,884 | B2 | * | 2/2019 | Tan ....................... H04W 24/02 |
| 2012/0020216 | A1 | | 1/2012 | Vashist et al. |
| 2016/0205697 | A1 | | 7/2016 | Tan et al. |
| 2017/0318468 | A1 | | 11/2017 | Aijaz |

OTHER PUBLICATIONS

Ferreira et al., Multiobjective Reinforcement Learning for Cognitive Satellite Communications Using Deep Neural Network Ensembles, IEEE Journal on Selected Areas in Communications, vol. 36, No. 5, May 2018, pp. 1030-1041.

* cited by examiner

*Primary Examiner* — Quochien B Vuong
(74) *Attorney, Agent, or Firm* — Botos Churchill IP Law

(57) ABSTRACT

The disclosure provides a method of operating a communication network. The method includes receiving input data related to a state of the communication network and operation of the communication network. The method then includes determining a policy for the communication network based on the input data. The policy is a set of features for forming a plurality of communication links in the communication network over a time interval. The plurality of communication links provides one or more paths through the communication network. Determining the policy is based at least in part on utility values of previous policies. The utility values of previous policies are derived using simulation and/or real-world implementation of the previous policies. The communication network is then operated to implement the policy in the time interval.

20 Claims, 6 Drawing Sheets

400B

OPERATION OF SECTORIZED COMMUNICATIONS FROM AEROSPACE PLATFORMS USING REINFORCEMENT LEARNING

BACKGROUND

Information can be transmitted over directional networks, such as aerospace and other mobile networks. In such networks, links can be formed between pairs of nodes by aiming transceivers of each node pair towards each other. In some implementations, nodes may include non-geostationary satellite orbit (NGSO) satellites or other high-altitude platforms (HAPs) that are in motion relative to the Earth. Such networks may provide service to geographic regions.

BRIEF SUMMARY

Aspects of the disclosure provide for a method of operating a communication network that includes a plurality of nodes. A first node of the plurality of nodes is in motion relative to a second node of the plurality of nodes. The method includes receiving, by one or more processors, input data related to a state of the communication network and input data related to operation of the communication network for a first time interval; determining, by the one or more processors, a first policy for the communication network based on the input data, the first policy being a set of features for forming a plurality of communication links in the communication network over the first time interval, the plurality of communication links providing one or more paths through the communication network; determining, by the one or more processors, a utility value associated with the first policy as a function of a performance metric of the communication network in the first time interval; determining, by the one or more processors, a second policy for the communication network for a second time interval based at least in part on the utility value associated with the first policy; and operating, by the one or more processors, the communication network to implement the second policy in the second time interval.

In one example, the plurality of nodes includes one or more non-geostationary satellites. In another example, the input data related to the operation of the communication network includes weather conditions or forecasts for atmospheric levels. In a further example, determining the utility value includes operating the communication network to implement the first policy; and determining a performance metric of the communication network while implementing the first policy. In yet another example, determining the utility value includes simulating implementation of the first policy in the communication network; and determining a predicted performance metric of the communication network in the simulation.

In a still further example, the one or more processors form a neural network. In this example, the method also includes training the neural network by receiving, by the one or more processors, input data related to state information of the communication network; determining, by the one or more processors, a training policy based on the input data; simulating, by the one or more processors, the training policy based on internal and external influences of the communication network; and determining, by the one or more processors, a utility value of the training policy according to the simulation. Also in this example, determining the first policy is also based on the training policy and the corresponding utility value. In yet another example, determining the first policy includes identifying a trend in features of policies stored in a database; and selecting features for the first implementation policy that increase a performance metric of the communication network according to the trend.

Other aspects of the disclosure provide for a system. The system includes a memory storing policies for a communication network, each policy being a set of features for forming a plurality of communication links in the communication network over a given time interval and being associated with a corresponding utility value, the utility value being a function of a performance metric of the communication network for the given time interval, the plurality of communication links providing one or more paths through the communication network; and one or more processors capable of accessing the memory, the one or more processors being configured to receive input data related to a state of the communication network and input data related to operation of the communication network for a first time interval; determine a first policy for the communication network based on the input data, the first policy being a set of features for forming a plurality of communication links in the communication network over the first time interval, the plurality of communication links providing one or more paths through the communication network; determine a utility value associated with the first policy as a function of a performance metric of the communication network in the first time interval; determine a second policy for the communication network for a second time interval based at least in part on the utility value associated with the first policy; and operate the communication network to implement the second policy in the second time interval.

In one example, the plurality of nodes includes one or more non-geostationary satellites. In another example, the input data related to the operation of the communication network includes weather conditions or forecasts for atmospheric levels. In a further example, the utility value is determined based on a performance metric of the communication network that is implementing the first policy. In yet another example, the utility value is determined based on a performance metric of the communication network that is simulated to implement the first policy.

In a still further example, the one or more processors form a neural network. In this example, the neural network is trained by receiving input data related to state information of the communication network; determining a training policy based on the input data; simulating the training policy based on internal and external influences of the communication network; and determining a utility value of the training policy according to the simulation. Also in this example, the first policy is determined also based on the training policy and the corresponding utility value. In yet another example, the first policy is determined based on a trend in features of policies stored in the memory.

Further aspects of the disclosure provide for a non-transitory, tangible computer-readable storage medium on which computer readable instructions of a program are stored. The instructions, when executed by one or more processors, cause the one or more processors to perform a method. The method includes receiving input data related to a state of the communication network and input data related to operation of the communication network for a first time interval; determining a first policy for the communication network based on the input data, the first policy being a set of features for forming a plurality of communication links in the communication network over the first time interval, the plurality of communication links providing one or more paths through the communication network; determining a utility value associated with the first policy as a function of a performance metric of the communication network in the first time interval; determining a second policy for the communication network for a second time interval based at least in part on the utility value associated with the first policy; and operating the communication network to implement the second policy in the second time interval.

In one example, the one or more processors form a neural network. In this example, the method also includes training the neural network by receiving input data related to state information of the communication network; determining a training policy based on the input data; simulating the training policy based on internal and external influences of the communication network; and determining a utility value of the training policy according to the simulation. Also in this example, the first policy is determined also based on the training policy and the corresponding utility value. In yet another example, the plurality of nodes includes one or more non-geostationary satellites.

DETAILED DESCRIPTION

Overview

The technology relates to planning and implementing network configurations for a temporospatial software-defined communication network by applying reinforcement learning. Each node of the communication network may be capable of forming a plurality of communication links by aligning terminals of the each node along particular pointing to a plurality of locations. Thus, many different configurations of the network may be possible at any given time.

To determine an overall configuration for the network for a given time interval, such as 5 seconds (or more or less), a plurality of input features may be processed to obtain a set of output features for a network configuration for the given time interval that allows the network to maximize a performance metric. The performance metric may be, for instance, amount of data transferred, number of users reached, or geographic area reached. In order to obtain a set of output features from the plurality of input features, a machine learning model may be used, such as a neural network.

The features described herein may provide a more efficient means for determining features for a temporospatial communication network configured for free-space optical communication. The network features may be determined in shorter intervals and may take into account a greater amount of variables, such as the motion of each node in the temporospatial communication network or an alignment of the nodes for optical communication. The machine learning model may be especially useful for a temporospatial communication network in order to account for all the variables that may arise in the network, such as when nodes are moving with respect to one another or when the network is software-defined. The variables for the communication network may increase greatly for every additional node of the network. The features may also allow for an improved performance of the communication network as better network features are selected over time based on associated utility values of past settings. In addition, a usable capacity of the network may be increased, which allows more users to be supported by the network. Still further, the features may allow for faster response to user requests for service.

EXAMPLE SYSTEMS

Figure 1:
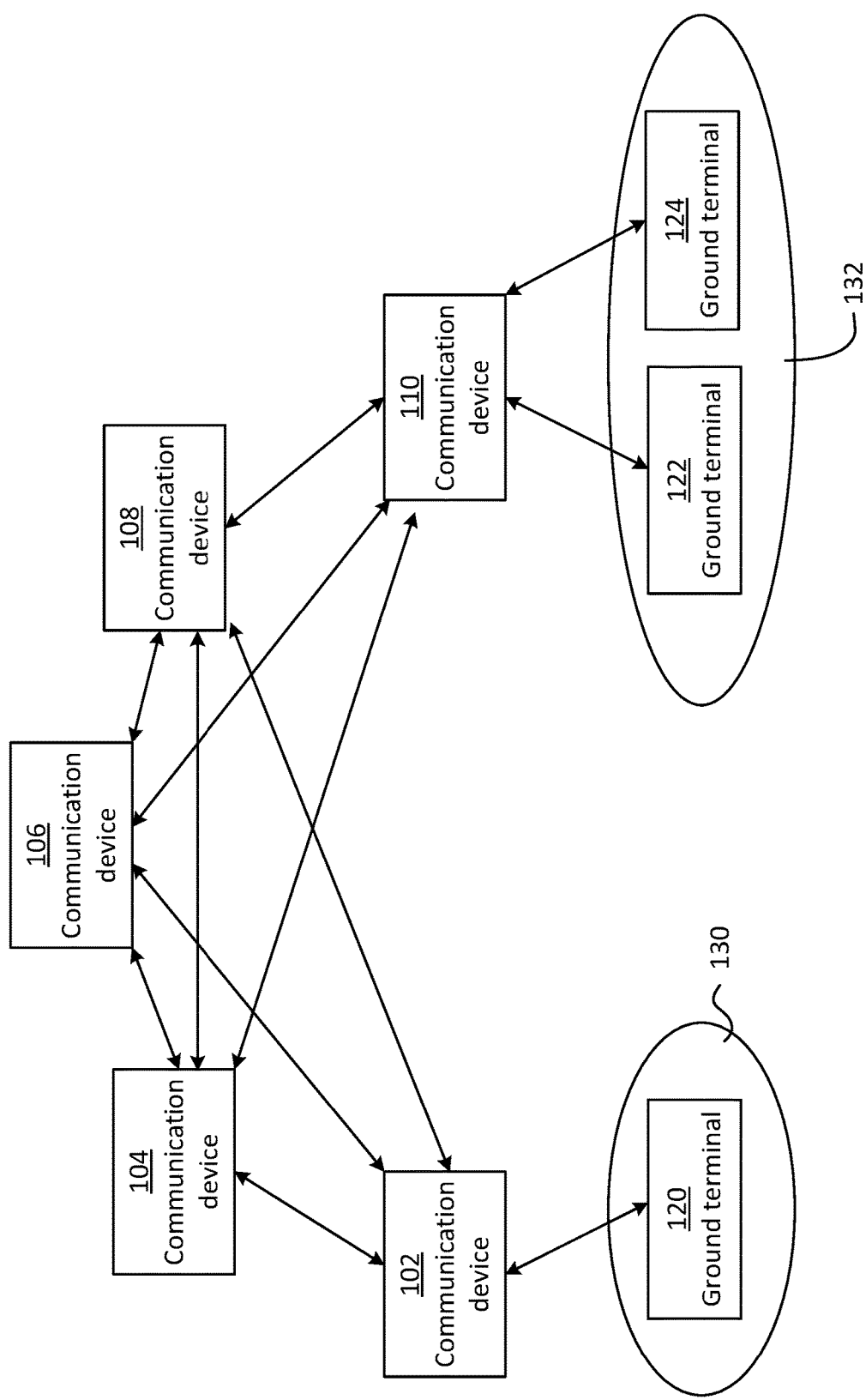
FIG. 1 is a block diagram 100 of a first communication device and a second communication device in accordance with aspects of the disclosure.

As shown in FIG. 1, a plurality of communication devices may be configured to form a plurality of communication links thereby forming a communication network 100. Each communication device is a node of the communication network 100. The plurality of communication devices in communication network 100 includes communication devices 102, 104, 106, 108, and 110. Each communication device of the plurality of communication devices may be a part of a communication terminal, such as a terrestrial communication terminal or a HAP terminal. HAPs may be balloons, blimps or other dirigibles, airplanes, unmanned aerial vehicles (UAVs), satellites, or any other form of high altitude platform. The satellites may be geostationary or non-geostationary. Communication devices may additionally or alternatively be part of other types of moveable or stationary communication terminals. At least one of the communication devices may be in motion relative to the other communication devices. The plurality of communication links may be a subset of all possible links between ones of the plurality of communication devices. In the topology shown in FIG. 1, all possible links are illustrated as arrows.

The communication network 100 may also include ground terminals 120, 122, and 124 as nodes. Ground terminal 120 is in first geographic area 130, and ground terminals 122 and 124 are in second geographic area 132. A ground terminal may include a communication device similar to communication devices 102, 104, 106, 108, 110 that is configured to be in communication with client devices or server devices. Client devices may be cellular phones, laptop computers, desktop computers, wearable devices, or tablet computers. In some implementations, the communication network 100 may serve as an access network for the client devices. The communication network 100 also may be connected to a larger network, such as the Internet, and may be configured to provide a client device with access to resources stored on or provided through the larger computer network. The communication network 100 as shown in FIG. 1 is illustrative only, and in some implementations the communication network 100 may include additional or different communication devices, client devices, or server devices.

Figure 2:
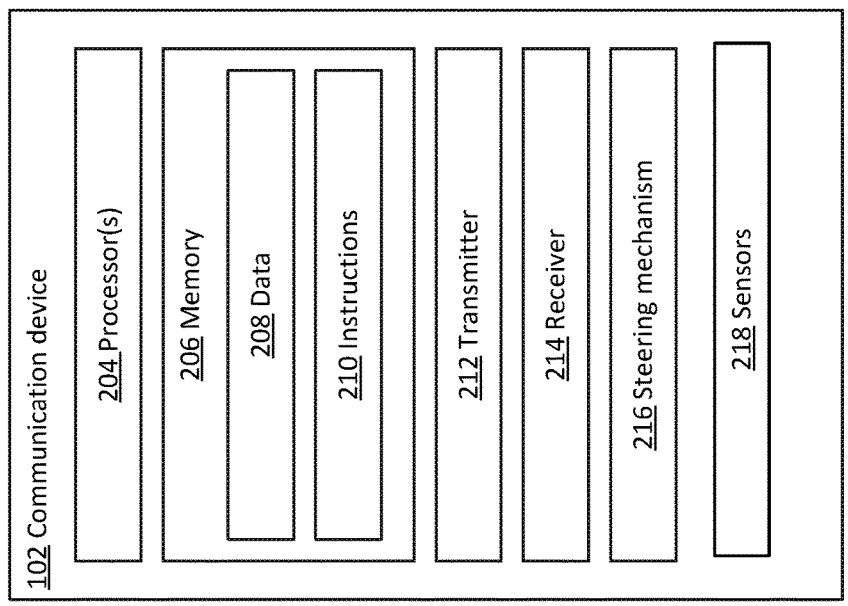
FIG. 2 is a pictorial diagram of a network 200 in accordance with aspects of the disclosure.

FIG. 2 is a block diagram 200 of first communication device 102 of a first communication terminal configured to form one or more links with a second communication device, such as communication device 104, 106, 108 or client device 120 in the topology of FIG. 1. For example, the first communication device 102 includes as components one or more processors 204, a memory 206, one or more transmitters 212, one or more receivers 214, a steering mechanism 216, and one or more sensors 218. The first communication device 102 may include other components not shown in FIG. 2.

The one or more processors 204 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 204 and memory 206 as being within the same block, the one or more processors 204 and memory 206 may actually comprise multiple processors and memories that may or may not be stored within the same physical housing. Accordingly, references to a processor or computer will be understood to include references to a collection of processors or computers or memories that may or may not operate in parallel.

Memory 206 may store information accessible by the one or more processors 204, including data 208, and instructions 210, that may be executed by the one or more processors 204. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 208 and instructions 210 are stored on different types of media. In the memory of each communication device, such as memory 206, calibration information may be stored, such as one or more offsets determined for tracking a signal.

Data 208 may be retrieved, stored or modified by the one or more processors 204 in accordance with the instructions 210. For instance, although the technology is not limited by any particular data structure, the data 208 may be stored in computer registers, in a relational database as a table having a plurality of different fields and records, XML documents or flat files.

The instructions 210 may be any set of instructions to be executed directly (such as machine code) or indirectly (such as scripts) by the one or more processors 204. For example, the instructions 210 may be stored as computer code on the computer-readable medium. In that regard, the terms "instructions" and "programs" may be used interchangeably herein. The instructions 210 may be stored in object code format for direct processing by the one or more processors 204, or in any other computer language including scripts or collections of independent source code modules that are interpreted on demand or compiled in advance. Functions, methods and routines of the instructions 210 are explained in more detail below.

The one or more processors 204 are in communication with the one or more transmitters 212 and the one or more receivers 214. One or more transmitters 212 and one or more receivers 214 may be part of a transceiver arrangement in the first communication device 102. In some implementations, the one or more transmitters 212 may be configured to transmit to a plurality of sectors, or geographic areas, such as by transmitting forty (40) communication beams to different sectors. The one or more processors 204 may therefore be configured to transmit, via the one or more transmitters 212, data in a signal, and also may be configured to receive, via the one or more receivers 214, communications and data in a signal. The one or more transmitters 212 may be configured to transmit an optical signal and/or another type of signal, such as a millimeter wave signal or a regular 4G type signal operating in standard 4G Long-Term Evolution (LTE) bands. The one or more receivers 214 may be configured to receive an optical signal or another type of signal, such as a millimeter wave signal or a regular 4G type signal operating in standard 4G LTE bands. The received signal may be processed by the one or more processors 204 to extract the communications and data.

Furthermore, the one or more processors 204 are in communication with the steering mechanism 216 for adjusting the pointing direction of the one or more transmitters 212, one or more receivers 214, and/or signal. The steering mechanism 216 may include one or more mirrors that steer a signal through the fixed lenses and/or a gimbal configured to move the one or more transmitters 212 and/or the one or more receivers 214 with respect to the communication device. The steering mechanism 216 may be configured to steer the transmitter(s), receiver(s), and/or signal in at least two degrees of freedom, such as, for example, yaw and pitch. The adjustments to the pointing direction may be made to acquire a communication link, such as a link between first communication device 102 and second communication device 104. To perform a search for a communication link, the one or more processors 204 may be configured use the steering mechanism 216 to point the one or more transmitters 212 and/or the one or more receivers 214 in a series of varying directions until a communication link is acquired. In addition, the adjustments may optimize transmission of light from the one or more transmitters 212 and/or reception of light at the one or more receivers 214.

The one or more processors 204 are also in communication with the one or more sensors 218. The one or more sensors 218, or estimators, may be configured to monitor a state of the first communication device 102. The one or more sensors may include an inertial measurement unit (IMU), encoders, accelerometers, or gyroscopes configured to measure one or more of pose, angle, velocity, torques, as well as other forces. In addition, the one or more sensors 218 may include one or more sensors configured to measure one or more environmental conditions such as, for example, temperature, wind, radiation, precipitation, humidity, etc. In this regard, the one or more sensors 218 may include thermometers, barometers, hygrometers, etc. While the one or more sensors 218 are depicted in FIG. 2 as being in the same block as the other components of the first communication device 102, in some implementations, some or all of the one or more sensors may be separate and remote from the first communication device 102.

Each of the communication devices 104, 106, 108, and 110 may include one or more processors, a memory, one or more transmitters, one or more receivers, a steering mechanism, and sensors similar to those described above. Communication devices of ground terminals 120, 122, and 124 may also include one or more processors, a memory, one or more transmitters, and one or more receivers as described above.

Figure 3:
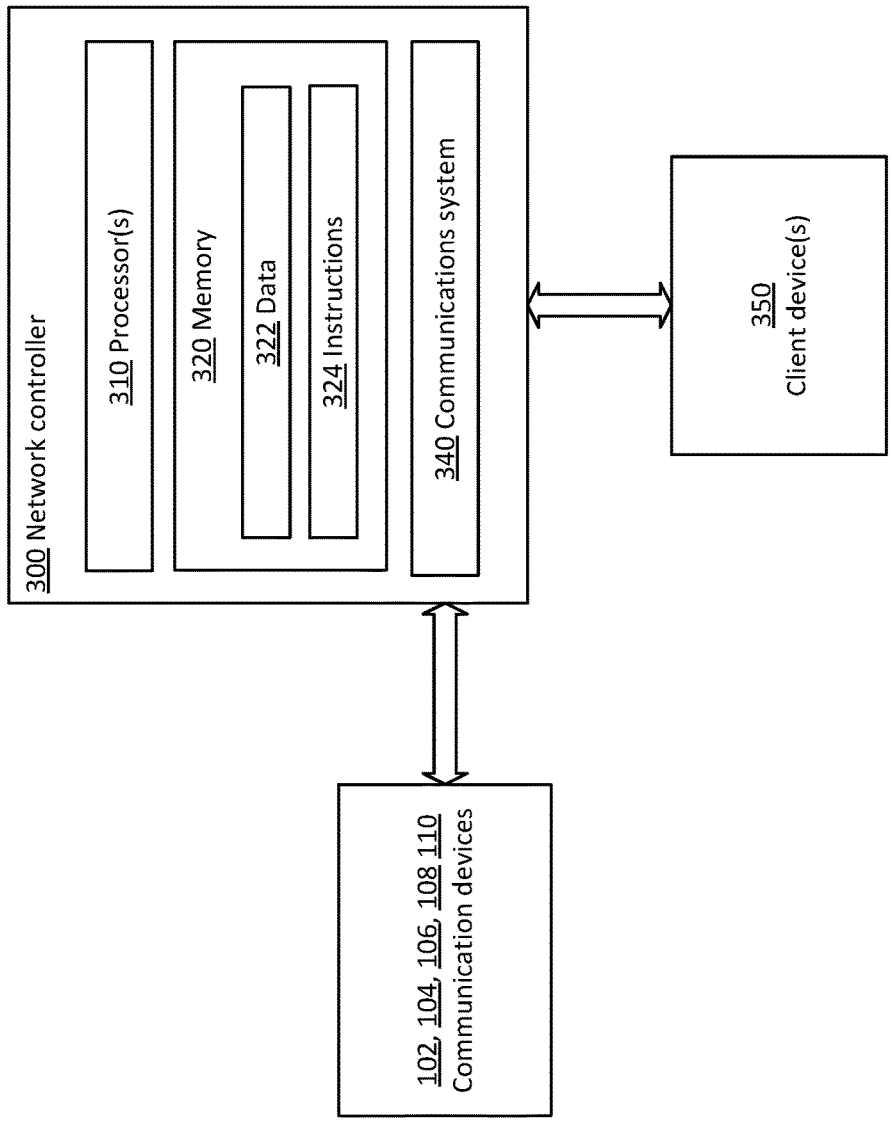
FIG. 3 is a block diagram of a system in accordance with aspects of the disclosure.

FIG. 3 is a block diagram 300 of network controller 300. The network controller 300 may be configured to send control messages to communication devices of the communication network 100. The messages may cause a given communication device of the communication network 100 to have one or more features as part of an overall policy for the given communication device or communication network 100. In some implementations, the network controller 300 may also be configured to pass routing information to the communication devices 102, 104, 106, 108, 110 of the communication network 100, to configure the topology of the network 100, or to schedule changes to the topology of the communication network 100 to transmit client data. The network controller 300 may also be configured to communicate with one or more client devices 350. As shown in FIG. 3, the network controller 300 may include one or more processors 310, memory, 320, and communications system 340. The one or more processors 310 may be similar to the one or more processors 204 described above. In addition, the one or more processors 310 may form a neural network or other type of computing device configured to implement a machine learning model.

Memory 320 may store information accessible by the one or more processors 310, including data 322 and instructions 324 that may be executed by processor 310. Memory 320, data 322, and instructions 324 may be configured similarly to memory 212, data 214, and instructions 216 described above. The data 322 may include a topology of communication network 100, availability of each communication device or link in communication network 100 for a given point in time or period of time, one or more communication paths through communication network 100 for a given point in time or period of time.

The communication system 340 may be used to communication with the communication devices 102, 104, 106, 108, 110 or the client devices 350. The communication system may include a Control to Data-Plane Interface (CDPI) driver configured to communicate with a CDPI agent at each of the communication devices. In addition, the communications system 340 of the network controller 300 may include one or more northbound interface (NBI) agents configured to communicate with an NBI driver at each ground terminal 120, 122, 124, or each client device 350 associated with one or more SDN applications. The communication system 340 may optionally or alternatively be configured to transmit and receive a signal via radio frequencies, optical frequencies, optical fiber, cable, or other communication means to and from the communication devices or client devices in the communication network 100.

EXAMPLE METHODS

Figure 4A:
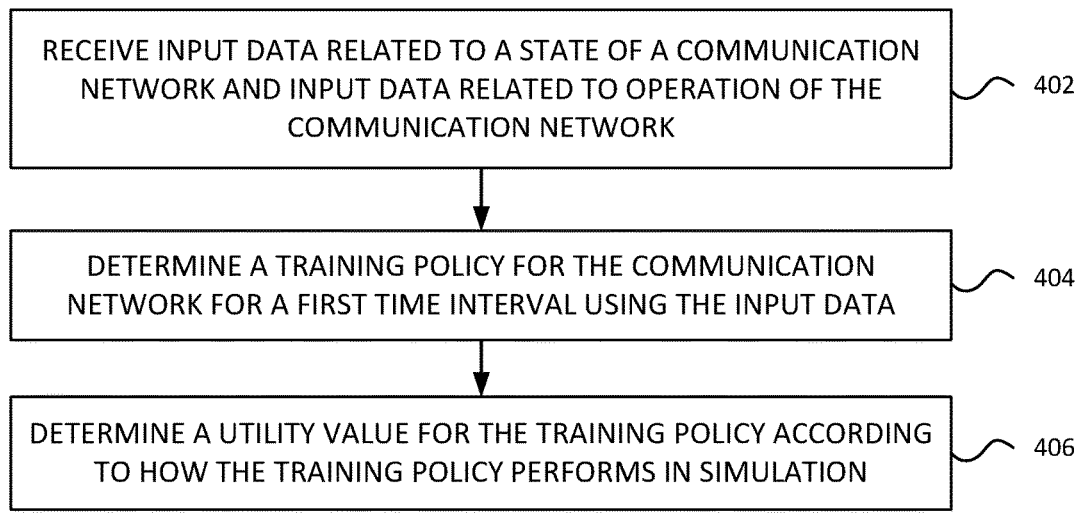
FIGS. 4A, 4B, and 4C are flow diagrams 400A, 400B, and 400C, respectively, depicting methods in accordance with aspects of the disclosure.
Figure 4B:
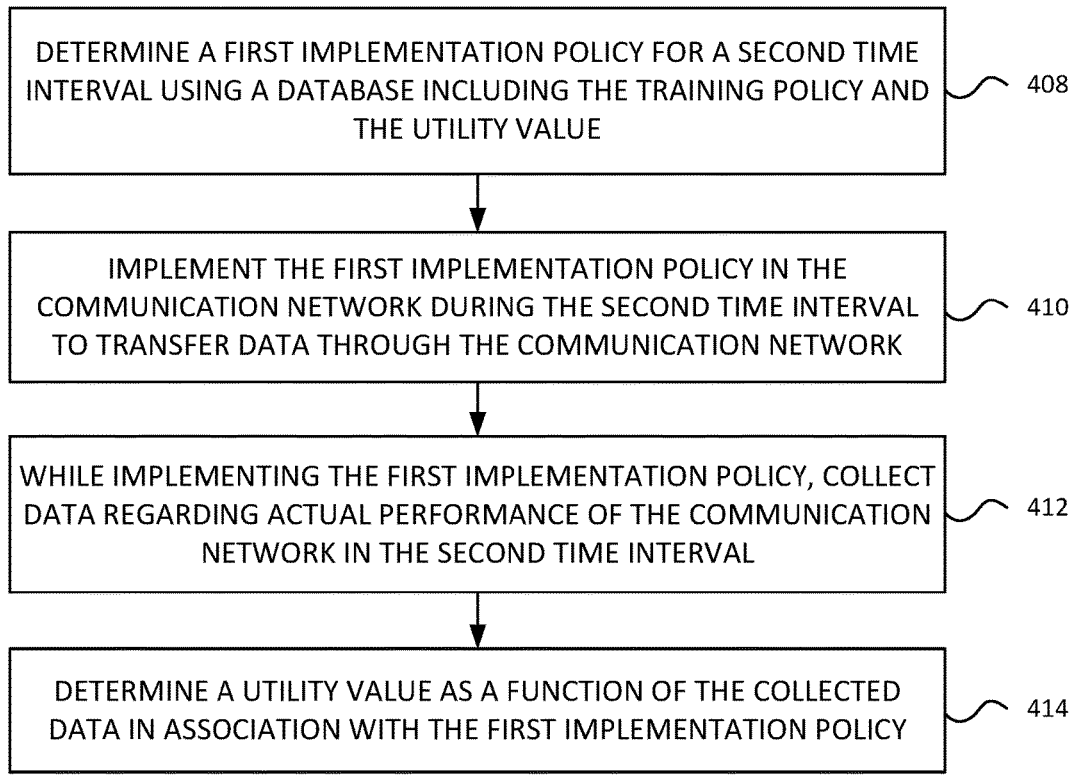
Figure 4C:
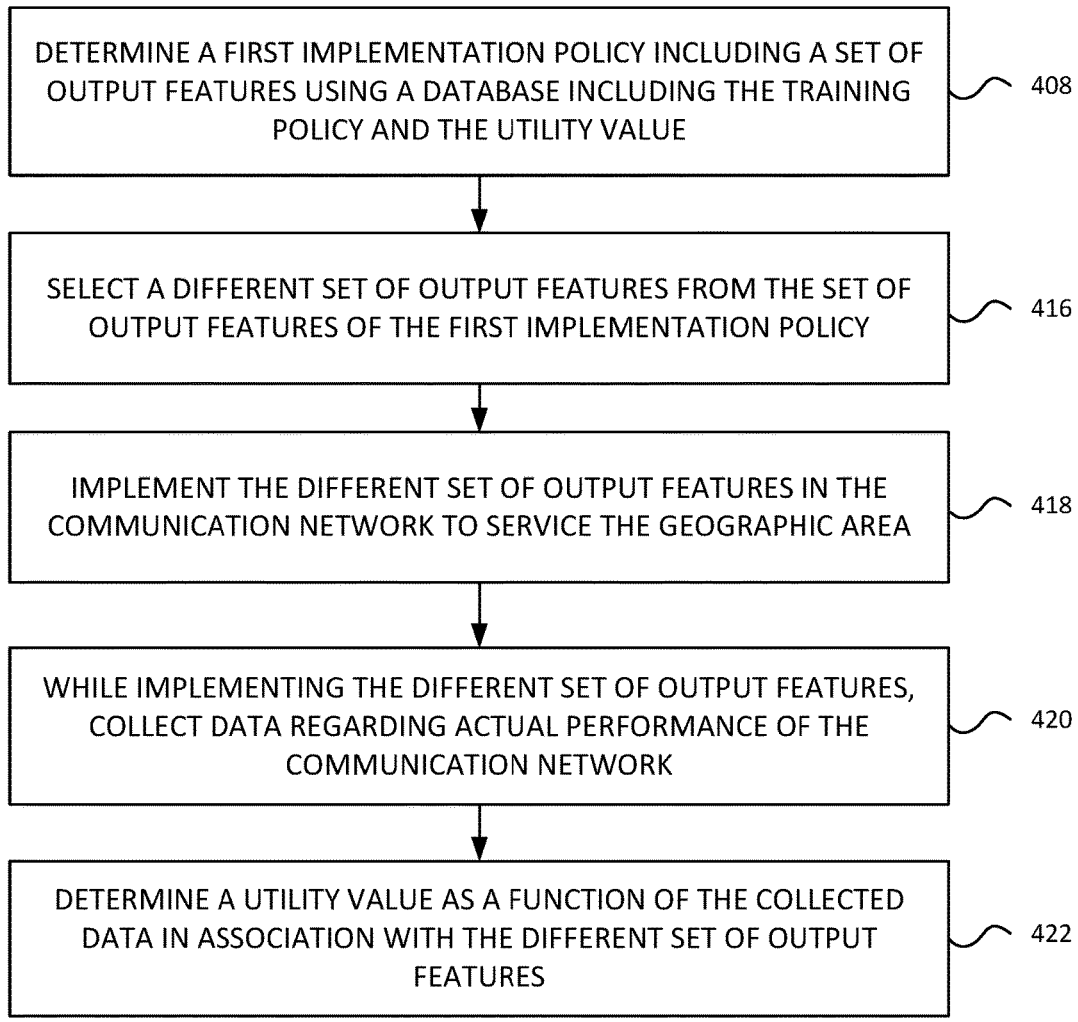

In FIGS. 4A-4C, flow diagrams 400A-400C are shown in accordance with some of the aspects described above that may be performed, for instance, by the one or more processors 310 of the network controller 300 in order to determine a set of features for the communication network 100 forming one or more communication links over a given time interval. A time interval may be a point in time or a time frame of five (5) seconds or more or less. Alternatively, the one or more processors of a communication device, such as one or more processors 204 of communication device 102, may perform some of the aspects in order to determine a set of features for the communication device for forming one or more communication links over a given time interval. While FIGS. 4A-4C show blocks in a particular order, the order may be varied and that multiple operations may be performed simultaneously. Also, operations may be added or omitted.

As shown in FIG. 4A, the one or more processors 310 may receive input data related to a state of the communication network 100 at block 402. The input data related to the state of the communication network 100 may include features of each communication device in the communication network 100, such as location, orientation, trajectory or orbital phase, power capacity, battery life, number of channels, backhaul bandwidth, or mechanics. In some implementations, the features of a given communication device may be collected using one or more sensors of the given communication device. The one or more processors of the given communication device may transmit the collected features to the network controller 300. For example, the features of communication device 102 may be collected by the one or more processors 204 using the one or more sensors 218 and transmitted to the network controller 300.

In addition or in an alternative implementation, additional input data related to the operation of the communication network 100 may also be received by the one or more processors 310, such as weather conditions or forecasts for atmospheric levels, behavior of the communication signal between communication devices given the curvature of the Earth, known or detected locations of geostationary satellites, population density, patterns of use, amounts of data to be transferred through the communication network 100, terrestrial terminal settings, terrestrial terminal locations, or constraints or regulations for the operation of the communication network 100. This data related to the operation of the communication network 100 may be received using one or more sensors of each communication device and/or a ground terminal in a geographic area. For example, the one or more sensors of a given communication device may detect environmental conditions around the given communication device, or the ground terminal may transmit forecasts provided by a remote computing device. In some further implementations, input data may also include a request from a client device regarding transfer of data over the communication network 100. The request may include a source location, a destination location for the transfer, an amount of data for the transfer, or a timing for the transfer.

At block 404, the one or more processors 310 may determine the set of output features for a network configuration, or "policy", for a first time interval using the input data. The one or more processors 310 may determine a first policy that maximizes one or more performance metrics of the communication network 100 according to constraints and/or rules of operation presented by the input data. The first policy may be a training policy for establishing a database of policies. The training policy may be determined to be a set of communication links and/or characteristics of communication beams for each communication link that overall satisfy the constraints and/or rules of operation presented by the input data. The set of communication links to be formed in the communication network 100 for the first time interval may create one or more paths through the communication network 100 according to the constraints and/or rules. For example, the one or more paths may be defined at least in part according to the details in the request from a client device for data transfer. The one or more paths may therefore include at least one path between the source location and the destination location and may have a capacity for transferring the amount of data specified at the timing specified by the request.

In addition, the characteristics for one or more communication beams for transmission and/or reception at each communication device of the communication network 100 for operation over the first time interval may be determined according to the constraints and/or rules. For example, the training policy may include characteristics of a communication beam for a communication link between a first communication device of a HAP terminal and a second communication device of a terrestrial communication terminal in a geographic area. Additionally or alternatively, the training policy may include characteristics of a communication beam between a third communication device of a HAP terminal and a client device in a geographic area. These characteristics may include a shape, power, direction, frequency, or channel designation of a communication beam over the first time interval. For example, when the input data indicates that mechanics of a communication device are configured to move a plurality of communication beams as one unit, rather than separately, the training policy may factor in this constraint when determining pointing directions of communication beams from the communication device. Similarly, a location, orientation, and/or trajectory of a communication device indicated by the input data may provide a constraint regarding what links are available to the communication device and pointing directions of communication beams for available links. For instance, links with communication devices within a linear distance and an angular distance from the communication device may be available to be included in the training policy. A power capacity or battery life of a communication device indicated by the input data may provide a constraint regarding how many channels may be operated on the one or more communication beams or how long a set number of channels may be operated on the communication beams in the training policy. The number of channel or backhaul bandwidth indicated by the input data may provide a constraint regarding an amount of data that may be transmitted over the one or more communication beams in the training policy.

In some cases, the characteristics may include an absence of a communication beam to and/or from a given communication device of the communication network 100, such as by turning off the communication beam the given communication device. For example, the training policy may include turning off a given communication device to conserve power of the given communication device when it is needed to serve a densely populated area to which it is travelling.

The process of determining a training policy based on received input data may be repeated for a plurality of iterations. The repetition of determining training policies may train the one or more processors 310 as a neural network. Each training policy may be for a same time interval or different time intervals with same or different input data. The input data for determining a training policy may be from a simulation of the communication network 100. For an initial one or more iterations, the one or more processors 310 may be configured to select output features for each training policy at random to establish a database of policies. For one or more subsequent iterations after the initial one or more iterations, the one or more processors 310 may be configured to determine output features based on previous policies from the database or by modifying existing heuristics.

For instance, the output features for a training policy may be determined by comparing the policies stored in the database, identifying a trend or a pattern in the output features of the stored policies, and selecting output features that would increase the one or more performance metrics of the communication network 100 according to the trend or pattern. The trend may be, for example, that a utility value is higher for previous policies where links between communication devices are closer to a particular length. As described further below, a utility value may be associated with the one or more performance metrics, such as an amount of data transferred, a number of users that are reached, or an amount of geographic area covered by the communication network 100 implementing a given policy. Using the example trend, the output features for the training policy may include links between communication devices at a distance that is as close to the particular length as possible given a topology of the communication network 100 derived from the input data.

At block 406, for a given iteration, the one or more processors 310 may determine a utility value for a training policy according to how the training policy performs in simulation. The simulation may factor in known internal influences, such as self-interference, total frequency allocated for communication, frequency split allowed due to payload constraints, polarization of antennas, time limitations on switching between settings, or total possible transmit power. The simulation may also factor in known external influences, such as how types of weather affect free-space optical communication. The simulation may also factor in data related to the operation of the communication network 100. As mentioned previously, this data may include weather conditions or forecasts for atmospheric levels, behavior of the communication signal between nodes given the curvature of the Earth, locations of geostationary satellites, population density, patterns of use, amounts of data to be transferred through the communication network 100, terrestrial terminal settings, terrestrial terminal locations, or constraints or regulations for the operation of the communication network 100.

Given the internal influences, external influences, and operation data of the communication network 100, the one or more processors 310 may predict one or more performance metrics of the communication network 100 implementing the training policy during the first time interval. For example, the utility value of the training policy may then be determined as a function of the predicted amount of data transferred, the predicted number of users that are reached, or the predicted amount of geographic area covered by the communication network 100 implementing the training policy. The utility value may be equal to the value of predicted amounts or numbers associated with the performance metrics, or may be determined based on the ratio of a predicted performance metric to a maximum number of the performance metric. As such, in this instance, the utility value may increase when the predicted performance metric increases. Conversely, the utility value may decrease when the predicted performance metric decreases.

The one or more processors 310 may associate the utility value with the training policy, such as in the database. This association may be used to inform subsequent policy determinations, as described below. Both the training policy and the utility value may be stored in the database. The process of determining a policy for a given state of the communication network 100 and associating a utility value to the policy may be repeated in order to perform machine learning.

In FIG. 4B, at block 408, to operate the communication network 100, a first implementation policy may be determined by the one or more processors 310 for a second time interval using the database in the manner described above with respect to the training policy. The first implementation policy may be determined after the one or more processors 310 have been trained as a neural network, as described in blocks 402, 404, and 406. For example, the one or more processors 310 may receive input data related to the state of the communication network 100 and the operation of the communication network 100 from one or more sensors of the communication devices. The input data may be received in a same or similar manner as described above in block 402. The set of output features for the first implementation policy may be determined based on previous policies in the database. In one example, the set of output features may be an output of the trained neural network that created the previous policies in response to previous inputs. In another example, the set of output features may be determined based on previous policies similar to the process as described in block 404, such as by identifying a trend or pattern in the output features.

For example, the set of output features of the first implementation policy may include characteristics of a communication beam for a communication link between a first communication device of a HAP terminal and a second communication device of a terrestrial communication terminal in a geographic area. The characteristics are the same or similar to the characteristics of the communication beam in the training policy described in block 404. Additionally or alternatively, the set of output features may include characteristics of a communication beam between a third communication device of a HAP terminal and a client device in a geographic area.

At block 410, the first implementation policy may then be implemented in the communication network 100 to transfer data through the communication network 100. The one or more processors 310 may transmit instructions to one or more of the communication devices 102, 104, 106, 108, 110 based on the output features determined for the first implementation policy. The instructions may cause the one or more communication devices to form a plurality of links that create at least one path through the communication network 100. The plurality of links may include one or more links with client devices 120, 122 and/or server device 124. The instructions may also cause the one or more communication devices to adjust a characteristic of one or more communication beams, such as a pointing direction, a power, a bandwidth, or a number of channels of a communication beam. The instructions may also cause a change to a trajectory of a moving terminal, such as a HAP terminal corresponding to one of the communication devices.

The process of determining implementation policies described in blocks 408 and 410 may then be repeated for one or more iterations. Iterations may be performed at regular time intervals, when a communication device travels a set distance, or when a length of a communication link increases or decreases by a set distance. Alternatively or additionally, iterations may be performed when another change is detected in a communication device or in a communication network, such as, for example, a set amount of decrease in battery level or a rotation of the communication device by a set amount.

In some implementations, the process further includes, while implementing the first implementation policy during the second time interval, data may be collected regarding actual performance of the communication network in the second time interval at block 412. For example, the collected data may include user equipment measurement reports, continuous quality improvement (CQI) reports, uplink signal-to-noise ratio (UL SINR) reports, or other observable measurements. The collected data may also include information detected using the sensors of one or more of the communication devices, such as the one or more sensors 218 of communication device 102.

At block 414, a utility value may be determined as a function of the collected data and associated with the first implementation policy and stored in the database in a same or similar manner as described in block 406. The utility value of the first implementation policy may be added to the database with previously determined utility values and be used to update the trend or pattern in the output features. A second implementation policy may then be determined using the updated trend or pattern for a third time interval.

In addition, as shown in FIG. 4C, the one or more processors 310 may determine the first implementation policy as described in block 408. Then, at block 416, the one or more processors 310 may select different output features from the set of output features for the first implementation policy. The different output features may be a variation of the set of output features for the first implementation policy. For example, the variation may include an increase or decrease to a shape, power, or frequency of a communication beam by a small degree, such as by 5% or more or less. The variation may also include an adjustment of a direction of the communication beam by a small degree, such as by 5% or more or less, or a selection of a different channel designation. Alternatively, the different output features may be selected at random without using the first implementation policy as a reference. Selecting different output features may allow for the discovery of improved policies that may not be anticipated by the trained neural network. At block 418, the different output features may be implemented in the communication network 100 by the one or more processors 310. At block 420, the one or more processors 310 may collect data regarding actual performance of the communication network 100 using the different output features similar to block 412. At block 422, the one or more processors 310 may determine the utility value of the different output features similar to block 414 and update the database of determined utility values and policies for use in future iterations.

In some alternatives, when the communication network is configured for a given signal type different from free-space optical communication, such as millimeter wave, the reinforcement learning may be performed using internal and external influences on the given signal type.

The features described above may provide a more efficient means for determining features for a temporospatial software-defined communication network configured for free-space optical communication. The network features may be determined in shorter intervals and may take into account a greater amount of variables, such as the motion of each node in the temporospatial software-defined communication network or an alignment of the nodes for optical communication. The machine learning model may be especially useful for a temporospatial software-defined communication network in order to account for all the variables that arise when nodes are moving with respect to one another. The variables for the communication network may increase greatly for every additional node of the network. The features also allow for an improved performance of the communication network as better network features are selected over time based on associated utility values of past settings. In addition, a usable capacity of the network may be increased, which allows more users to be supported by the network. The features may also allow for faster response to user requests for service.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of operating a communication network that includes a plurality of nodes, a first node of the plurality of nodes being in motion relative to a second node of the plurality of nodes, the method comprising:

receiving, by one or more processors, input data related to a state of the communication network and input data related to operation of the communication network for a first time interval;

determining, by the one or more processors, a first policy for the communication network based on the input data, the first policy being a set of features for forming a plurality of communication links in the communication network over the first time interval, the plurality of communication links providing one or more paths through the communication network;

determining, by the one or more processors, a utility value associated with the first policy as a function of a performance metric of the communication network in the first time interval;

determining, by the one or more processors, a second policy for the communication network for a second time interval based at least in part on the utility value associated with the first policy; and operating, by the one or more processors, the communication network to implement the second policy in the second time interval.

2. The method of claim 1, wherein the plurality of nodes includes one or more non-geostationary satellites.

3. The method of claim 1, wherein the input data related to the operation of the communication network includes weather conditions or forecasts for atmospheric levels.

4. The method of claim 1, wherein determining the utility value includes:

operating the communication network to implement the first policy; and determining a performance metric of the communication network while implementing the first policy.

5. The method of claim 1, wherein determining the utility value includes:

simulating implementation of the first policy in the communication network; and determining a predicted performance metric of the communication network in the simulation.

6. The method of claim 1, wherein the one or more processors form a neural network.

7. The method of claim 6, further comprising training the neural network by:

receiving, by the one or more processors, input data related to state information of the communication network;

determining, by the one or more processors, a training policy based on the input data;

simulating, by the one or more processors, the training policy based on internal and external influences of the communication network; and determining, by the one or more processors, a utility value of the training policy according to the simulation; and wherein determining the first policy is further based on the training policy and the corresponding utility value.

8. The method of claim 1, wherein determining the first policy includes:

identifying a trend in features of policies stored in a database; and selecting features for the first implementation policy that increase a performance metric of the communication network according to the trend.

9. A system comprising:

a memory storing policies for a communication network, each policy being a set of features for forming a plurality of communication links in the communication network over a given time interval and being associated with a corresponding utility value, the utility value being a function of a performance metric of the communication network for the given time interval, the plurality of communication links providing one or more paths through the communication network; and one or more processors capable of accessing the memory, the one or more processors being configured to:

receive input data related to a state of the communication network and input data related to operation of the communication network for a first time interval;

determine a first policy for the communication network based on the input data, the first policy being a set of features for forming a plurality of communication links in the communication network over the first time interval, the plurality of communication links providing one or more paths through the communication network;

determine a utility value associated with the first policy as a function of a performance metric of the communication network in the first time interval;

determine a second policy for the communication network for a second time interval based at least in part on the utility value associated with the first policy; and operate the communication network to implement the second policy in the second time interval.

10. The system of claim 9, wherein the plurality of nodes includes one or more non-geostationary satellites.

11. The system of claim 9, wherein the input data related to the operation of the communication network includes weather conditions or forecasts for atmospheric levels.

12. The system of claim 9, wherein the utility value is determined based on a performance metric of the communication network that is implementing the first policy.

13. The system of claim 9, wherein the utility value is determined based on a performance metric of the communication network that is simulated to implement the first policy.

14. The system of claim 9, wherein the one or more processors form a neural network.

15. The system of claim 14, wherein the neural network is trained by:

receiving input data related to state information of the communication network;

determining a training policy based on the input data;

simulating the training policy based on internal and external influences of the communication network; and determining a utility value of the training policy according to the simulation; and wherein the first policy is determined further based on the training policy and the corresponding utility value.

16. The system of claim 9, wherein the first policy is determined based on a trend in features of policies stored in the memory.

17. A non-transitory, tangible computer-readable storage medium on which computer readable instructions of a program are stored, the instructions, when executed by one or more processors, cause the one or more processors to perform a method, the method comprising:

receiving input data related to a state of the communication network and input data related to operation of the communication network for a first time interval;

determining a first policy for the communication network based on the input data, the first policy being a set of features for forming a plurality of communication links in the communication network over the first time interval, the plurality of communication links providing one or more paths through the communication network;

determining a utility value associated with the first policy as a function of a performance metric of the communication network in the first time interval;

determining a second policy for the communication network for a second time interval based at least in part on the utility value associated with the first policy; and operating the communication network to implement the second policy in the second time interval.

18. The medium of claim 17, wherein the one or more processors form a neural network.

19. The medium of claim 18, wherein the method further comprises training the neural network by:

receiving input data related to state information of the communication network;

determining a training policy based on the input data;

simulating the training policy based on internal and external influences of the communication network; and determining a utility value of the training policy according to the simulation; and wherein the first policy is determined further based on the training policy and the corresponding utility value.

20. The medium of claim 17, wherein the plurality of nodes includes one or more non-geostationary satellites.

* * * * *

UNITED STATES PATENT AND TRADEMARK OFFICE
CERTIFICATE OF CORRECTION

PATENT NO. : 10,477,418 B1
APPLICATION NO. : 16/222407
DATED : November 12, 2019
INVENTOR(S) : Sharath Ananth, Brian Barritt and Jin Zhang Page 1 of 1

It is certified that error appears in the above-identified patent and that said Letters Patent is hereby corrected as shown below:

In the Claims

Claim 8 Column 13, Line 60:
Now reads "features for the first implementation policy";
Should read -- features for the first policy --

Signed and Sealed this
Fourteenth Day of January, 2020

Andrei Iancu
*Director of the United States Patent and Trademark Office*